United States Patent
Hotta et al.

(10) Patent No.: US 9,097,516 B2
(45) Date of Patent: Aug. 4, 2015

(54) SURFACE ANGLE AND SURFACE ANGLE DISTRIBUTION MEASUREMENT DEVICE

(71) Applicant: FUJI XEROX CO., LTD., Tokyo (JP)

(72) Inventors: Hiroyuki Hotta, Kanagawa (JP); Hideo Nakayama, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 43 days.

(21) Appl. No.: 14/192,122

(22) Filed: Feb. 27, 2014

(65) Prior Publication Data
US 2014/0362369 A1    Dec. 11, 2014

(30) Foreign Application Priority Data
Jun. 11, 2013    (JP) .................................. 2013-123062

(51) Int. Cl.
G01B 11/26    (2006.01)
G01B 11/245    (2006.01)

(52) U.S. Cl.
CPC .............. *G01B 11/245* (2013.01); *G01B 11/26* (2013.01)

(58) Field of Classification Search
CPC .............................. G01B 11/245; G01B 11/26
USPC .......................................... 356/138, 601, 612
See application file for complete search history.

(56) References Cited

U.S. PATENT DOCUMENTS

2014/0176938 A1*    6/2014    Yang et al. .................... 356/138

FOREIGN PATENT DOCUMENTS

| JP | A-09-050154 | 2/1997 |
| JP | A-2005-017257 | 1/2005 |
| JP | A-2005-241607 | 9/2005 |

* cited by examiner

*Primary Examiner* — Roy M Punnoose
(74) *Attorney, Agent, or Firm* — Oliff PLC

(57) ABSTRACT

Provided is a measurement device including a light source that sequentially emits plural beams of light which are respectively incident on an object and of which optical axes are parallel or substantially parallel to each other, a condensing optical system that condenses the plural beams of light reflected from the object or the plural beams of light transmitted through the object, a light receiving unit, a light receiving surface of which is placed on a back focal plane of the condensing optical system, and that outputs a distribution or a center position of an intensity of light received in the light receiving surface, and a measurement unit that measures at least one of an angle and an angle distribution of a surface of the object, based on an output value output from the light receiving unit for each light applied to the object from the light source.

20 Claims, 17 Drawing Sheets

FIG. 10
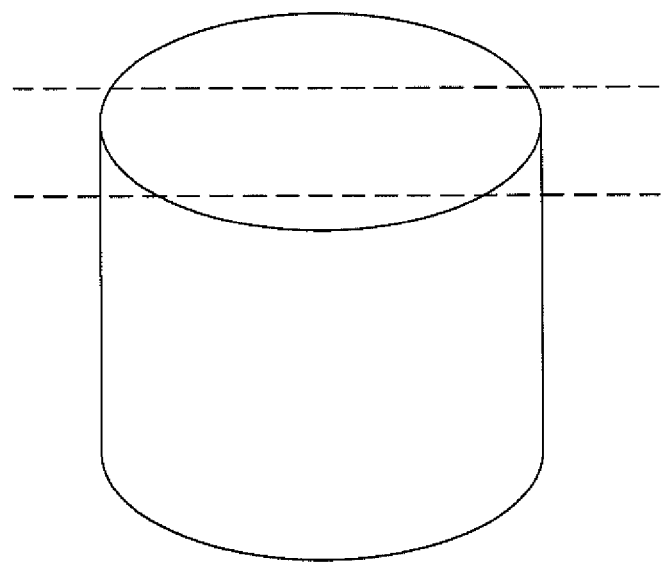
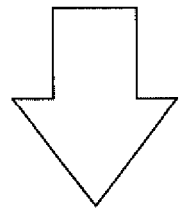
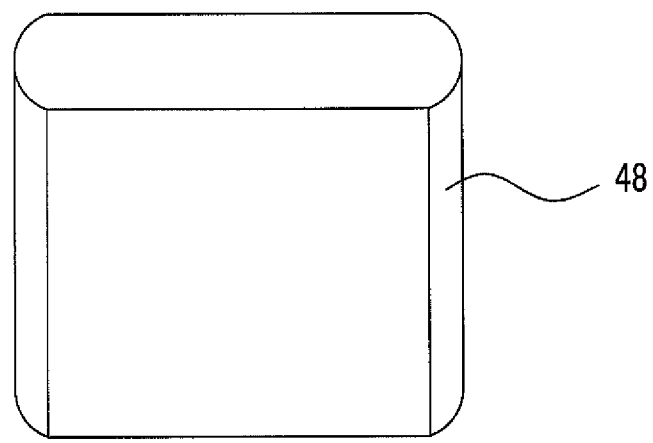

SURFACE ANGLE AND SURFACE ANGLE DISTRIBUTION MEASUREMENT DEVICE

CROSS-REFERENCE TO RELATED APPLICATIONS

This application is based on and claims priority under 35 USC 119 from Japanese Patent Application No. 2013-123062 filed Jun. 11, 2013.

BACKGROUND

Technical Field

The present invention relates to a measurement device.

SUMMARY

According to an aspect of the invention, there is provided a measurement device including:

a light source that sequentially emits plural beams of light which are respectively incident on an object and of which optical axes are parallel or substantially parallel to each other;

a condensing optical system that condenses the plural beams of light reflected from the object or the plural beams of light transmitted through the object;

a light receiving unit, a light receiving surface of which is placed on a back focal plane of the condensing optical system, and that outputs a distribution or a center position of an intensity of light received in the light receiving surface; and a measurement unit that measures at least one of an angle and an angle distribution of a surface of the object, based on an output value output from the light receiving unit for each light applied to the object from the light source.

BRIEF DESCRIPTION OF THE DRAWINGS

Exemplary embodiments of the present invention will be described in detail based on the following figures, wherein:

FIG. 10 is a diagram showing another configuration example of the measurement device;

DETAILED DESCRIPTION

Hereinafter, an exemplary embodiment of the present invention will be described with reference to drawings.

Figure 1:
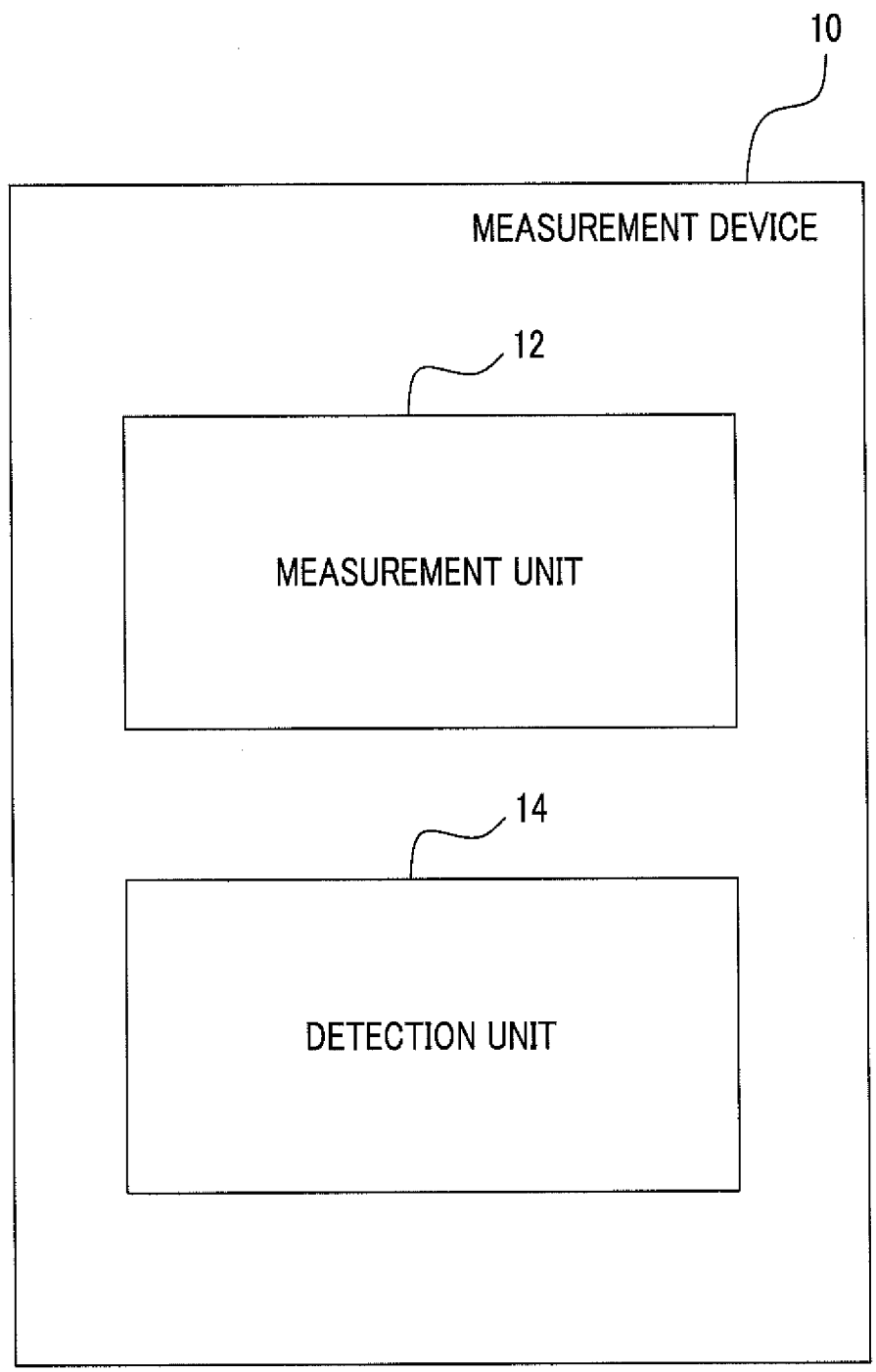
FIG. 1 is a diagram showing a configuration example of a measurement device according to an exemplary embodiment.

FIG. 1 is a diagram showing a configuration example of a measurement device 10 which performs an angle measurement of a surface of an object to be measured OB. The measurement device 10 includes a measurement unit 12 and a detection unit 14.

Figure 2:
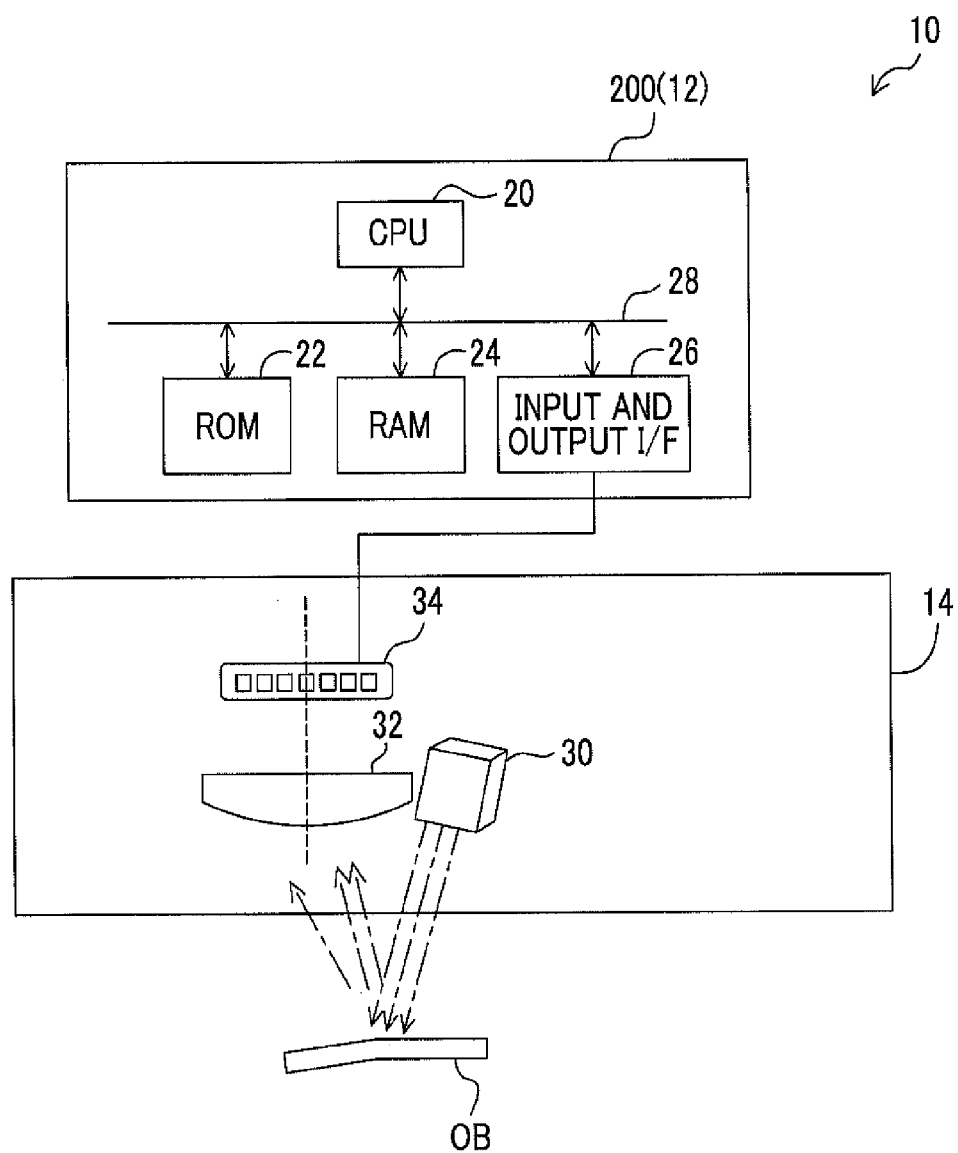
FIG. 2 is a diagram showing a specific configuration example of a measurement unit and a detection unit.

FIG. 2 shows a specific configuration example of the measurement unit 12 and the detection unit 14.

The detection unit 14 includes a light source unit 30, a condensing optical system (hereinafter, referred to as a condensing lens) 32, and an optical receiver 34.

The light source unit 30 is configured to include a light source sequentially emitting plural beams of light which are each incident on an object to be measured OB and of which optical axes are parallel or substantially parallel with each other. Thus, light may be applied such that the irradiation positions in the optical axis portions of the plural beams of light are to be different positions on the object to be measured OB. In the present exemplary embodiment, the light source included in the light source unit 30 has plural light emitting units which are integrally formed. The respective light emitting units sequentially (with a time difference) emit light, and thus the object to be measured OB is irradiated with light sequentially (with the time difference). Although it is assumed that the plural light emitting units are arranged in one dimension in the present exemplary embodiment, the light emitting units may be arranged in two dimensions.

In addition, while the configuration of the light source is not limited thereto, for example, a single light emitting unit may be provided, the light which is emitted from the light emitting unit may be branched by a mirror or the like so that the object to be measured OB is irradiated with the branched light, or a single light source may emit light while being moved by an installed movement mechanism.

Further, an LED may be used as the light emitting unit of the light source, but a semiconductor laser may be used as that. The semiconductor laser, for example, may be an Edge Emitting Laser (EEL) in which a cavity is formed in a direction along a semiconductor substrate and light from a cleaved side surface (hereinafter, the light from the semiconductor laser is referred to as light beams) is emitted in the direction along the semiconductor substrate. Otherwise, a Surface Emitting Laser (SEL) from which light beams are emitted perpendicularly to the semiconductor substrate, more specifically, a Vertical Cavity Surface Emitting Laser (VCSEL) in which a cavity is elaborated perpendicular to the semiconductor substrate, may be used. Since plural light beams of which optical axes are parallel or substantially parallel to each other may be emitted from a single element by using the VCSEL, configuration components are considerably simplified. The intervals and parallelism between the optical axes of plural light beams are ensured by the accuracy of the semiconductor process, and the light beams may be emitted electronically at an accurate timing while the light is emitted sequentially. In the present exemplary embodiment, it is assumed that the VCSEL is used with the light source included in the light source unit 30.

The condensing lens 32 condenses the light reflected from the object to be measured OB.

The optical receiver 34, in which a light receiving surface is placed on a back focal plane of the condensing lens 32, outputs the light intensity distribution of the light received in the light receiving surface. In addition, in FIG. 2, the optical receiver 34 is placed such that the center position of the light receiving surface of the optical receiver 34 is on the center axis of the lens (optical axis of the lens) in the condensing lens 32, but it is not limited thereto. The optical receiver 34, for example, may be an imaging element in which plural pixels are arranged in one dimension or two dimensions. Further, the imaging element may be either one of a Charge Coupled Device (CCD) and Complementary Metal Oxide Semiconductor (CMOS). Furthermore, the optical receiver 34, for example, may be a Position Sensitive Detector (PSD). In the PSD, the center position of the intensity of light which is received in the light receiving surface is output.

The measurement unit 12 measures at least one of the angle and the angle distribution of the surface of the object to be measured OB based on the output value which is output from the optical receiver 34 for each light which is applied to the object from the light source unit 30.

The measurement unit 12, as shown in FIG. 2, may be realized by a computer 200. The computer 200 includes a Central Processing Unit (CPU) 20, a Read Only Memory (ROM) 22, a Random Access Memory (RAM) 24, and an input and an output interface (input and output IF) 26, which are connected to each other through a bus 28.

Various types of programs which are executed mainly by the CPU 20 and various types of data are stored in advance in the ROM 22. The various types of programs include a program for measuring the angle or the angle distribution of the surface of the object to be measured OB based on the output value which is output from the optical receiver 34 for each light which is applied to the object from the light source unit 30. Various types of data associated with the process of the CPU 20 are temporarily stored in the RAM 24.

Further, the recording medium having programs to be executed by the CPU 20 recorded therein is not limited to the ROM 22, but for example, may be a hard disk drive (HDD), a CD-ROM, a portable recording medium such as a DVD disk, a magnetooptical disk, or an IC card, a storage device such as an HDD provided outside of the measurement unit 12, a database connected through a network, or other computer systems and the databases thereof.

Further, the input and output IF 26 is connected to the optical receiver 34. The input and output IF 26 outputs the output value from the optical receiver 34 to the CPU 20.

Furthermore, the computer 200 may be allowed to perform the emission control of the light source unit 30.

Next, the operation of the measurement device 10 of the present exemplary embodiment will be described.

The light source unit 30 sequentially radiates light beams one by one to the surface of the object to be measured OB. The reflected light from the object to be measured OB is incident on the condensing lens 32, and is condensed on the light receiving surface (back focal plane of the condensing lens 32) of the optical receiver 34 by the condensing lens 32 so as to be received in the optical receiver 34.

The measurement unit 12 acquires the light intensity distribution or the center position of the reflected light from the optical receiver 34 and obtains at least one of the angle and the angle distribution of the surface of the object to be measured OB, for each light beam which is applied to the object to be measured OB.

Figure 3:
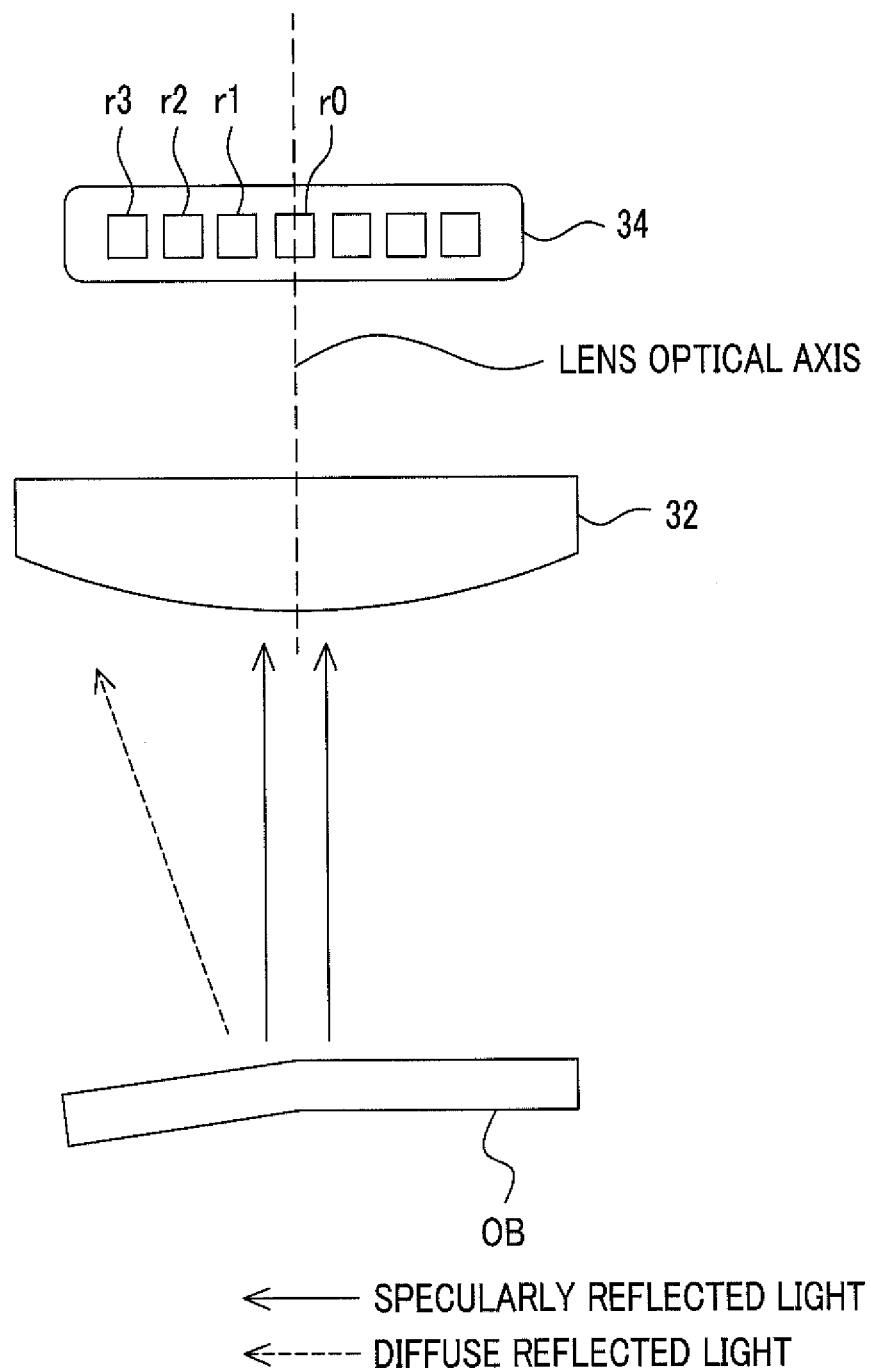
FIG. 3 is a diagram schematically showing an example of reflected light when an optical receiver, which receives the reflected light by an imaging element having plural pixels arranged in one dimension, is placed such that the center of a light receiving surface of the optical receiver is positioned on a lens optical axis of a back focal plane of a condensing lens, and light beams are applied from a direction perpendicular to the object to be measured.

A measurement method of the measurement unit 12 will be described with reference to FIG. 3. FIG. 3 is a diagram schematically showing an example of reflected light when the optical receiver 34, which receives the reflected light by the imaging element having plural pixels arranged in one dimension, is placed such that the center of the light receiving surface of the optical receiver 34 is positioned on the lens optical axis of the back focal plane of the condensing lens 32, and light beams are applied from a direction perpendicular to the object to be measured OB.

In FIG. 3, in the imaging element of the optical receiver 34, the pixel positioned on the lens optical axis of the condensing lens 32 is denoted by a symbol r0. The pixels which are arranged outwardly from the pixel r0 are assigned the symbols r1, r2, and r3 in order.

Among the reflected light which is reflected from the surface of the object to be measured OB, the light which is specularly reflected from the object to be measured OB is condensed on the lens optical axis of the back focal plane of the condensing lens 32. Accordingly, in FIG. 3, the intensity of the light received by the pixel r0 reaches a maximum (peak position is in the proximity of r0). In addition, the light reflected at an angle inclined by θ from the lens optical axis is condensed at the position which is separated by the distance f as shown in the below expression (1) outwardly from the lens optical axis on the back focal plane of the condensing lens 32. In FIG. 3, the intensity of the light received by any one of the pixels r1 to r3 reaches a maximum.

$$\text{Distance } r = f \tan \theta \tag{1}$$

Here, f is a front focal length of the condensing lens 32. The distribution of the light condensed on the focal plane is likely to be approximated to a Gaussian distribution. Accordingly, for example, when the optical receiver 34 is an imaging element having plural pixels arranged, based on the center position or the diffusion pattern of the light intensity distribution obtained from the output value from each pixel, the optical receiver 34 may calculate the central angle θ of the reflection points on which light beams are reflected from the object to be measured OB, and calculate a direction, an angle and a proportion of scattering of the light, that is, the degree of scattering of the reflection (reflection angle distribution). Further, since the center position is obtained when the optical receiver 34 is the PSD, it is possible to measure the central angle θ of the reflection.

In addition, the measurement unit 12 may use at least one of the central angle θ of the reflection and the reflection angle distribution as a value indicating the angle (inclination) of the surface of the object to be measured OB, and may store the association between at least one of the central angle θ of the reflection and the reflection angle distribution, and the angle (inclination) of the surface of the object to be measured OB so as to obtain the value indicating the angle of the surface of the object to be measured OB from θ.

Since the irradiation positions of respective light beams are different from each other, as a result, the measurement unit 12 may obtain the angle distribution of the irradiation region by the plural light beams on the surface of the object to be measured OB.

Since the angle θ is obtained regardless of the position in the height direction of the surface of the object to be measured OB, as apparent from the above expression (1), even when the position of the object to be measured OB fluctuates in the vertical direction, the measurement unit 12 may measure the angle without being affected by the position change.

In addition, when the detection unit 14 is configured as shown in FIG. 2, since the object to be measured OB is irradiated with light beams from the inclined direction, the reflected light from the object to be measured OB is reflected to the position that deviates to the opposite side of the light source unit 30 by the angle between the light emitted from the light source unit 30 and the lens optical axis. Accordingly, the light condensing position (focal position) of the specularly reflected light from the object to be measured OB deviates from the lens optical axis, and the output (peak position) obtained when the specularly reflected light is received in the optical receiver 34 deviates from the center position of the light receiving surface of the optical receiver 34 (in a direction away from the light source unit 30). Therefore, the angle between the light emitted from the light source unit 30 and the lens optical axis may be set in the measurement unit 12 in order to measure the angle in view of the amount of deviation.

However, in this manner, when the light condensing position of the specularly reflected light from the object to be measured OB deviates outwardly from the lens optical axis, the reflection angle range that can be measured becomes narrow. Accordingly, the optical receiver 34 may be installed by shifting the position thereof to widen the measurement range.

Figure 4:
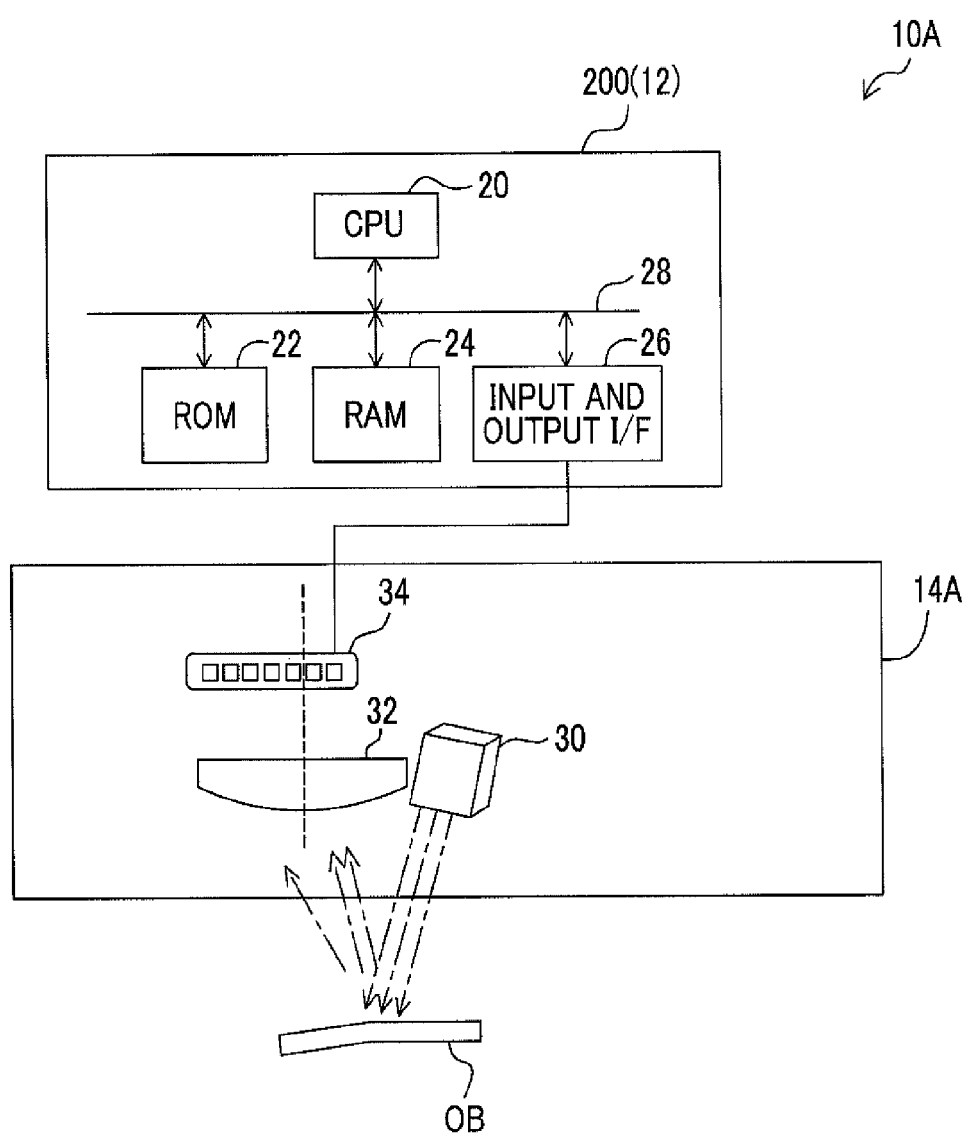
FIG. 4 is a diagram showing another configuration example of the measurement device.

FIG. 4 shows a measurement device 10A (letter A is assigned so as to be distinguished from the measurement device 10 in FIG. 1) configured by shifting the position of the optical receiver 34. In the measurement device 10A, the parts same as or equivalent to those in the measurement device 10 are assigned the same symbols, and the description thereof will be omitted.

As shown in FIG. 4, the measurement device 10A includes the measurement unit 12 and a detection unit 14A. The detection unit 14A includes the light source unit 30, the condensing lens 32, and the optical receiver 34. The optical receiver 34 of the detection unit 14A is arranged such that the center position of the light receiving surface is the position which is shifted outwardly from the lens optical axis (in the direction away from the light source unit 30 in FIG. 4). More specifically, the position of the optical receiver 34 is arranged by being shifted outwardly such that the light condensing position of the specularly reflected light is the center position of the optical receiver 34. In other words, the optical receiver 34 is shifted in the direction opposite to the irradiation direction of the light from the light source unit 30.

Thus, it is possible to receive the specularly reflected light at the center position of the light receiving surface of the optical receiver 34, thereby reading a wide reflection angle range by effectively using the area of the light receiving surface of the optical receiver 34. For example, when it is assumed that the condensing lens 32 is the lens having a focal length of 20 mm and the optical receiver 34 is the imaging element having a light receiving surface of which one side length is 6.8 mm, in the above expression (1), that is, r=f·tan θ, it is established that a maximum length $r_{max}$=6.8/2 mm and f=20 mm. Therefore, the full width of the read angle (θ×2) may be up to 20°, and the measurement range may be enlarged.

By the optical receiver 34 being provided in this manner, it is possible to effectively use the light receiving area of the optical receiver 34.

Figure 5:
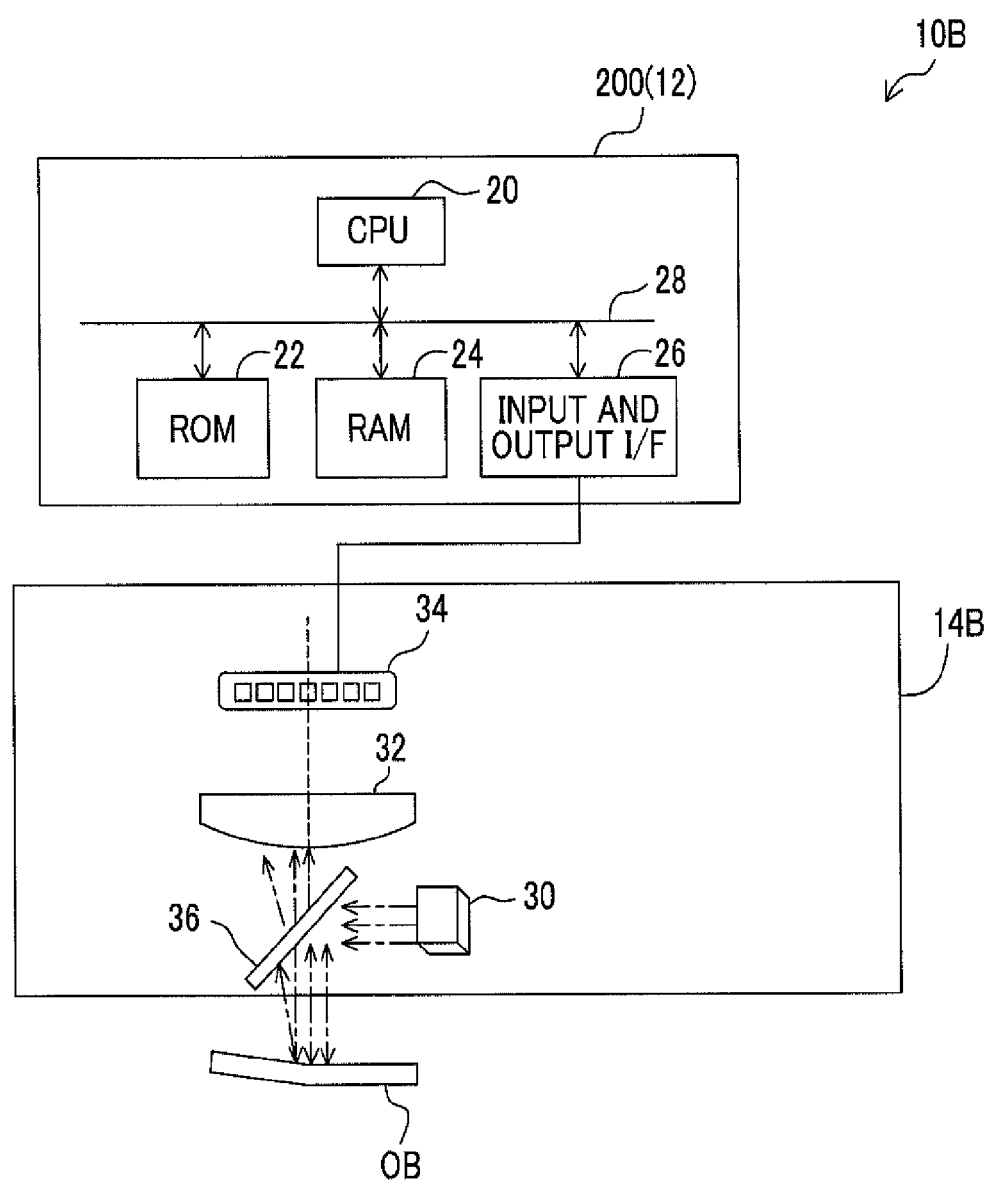
FIG. 5 is a diagram showing still another configuration example of the measurement device.

In addition, as shown in FIG. 5, the detection unit 14 may be configured such that the object to be measured OB may be irradiated with light beams from the immediately above position (in the vertical direction).

A measurement device 10B shown in FIG. 5 includes the measurement unit 12 and a detection unit 14B. The detection unit 14B includes the light source unit 30, the condensing lens 32, the optical receiver 34, and a half mirror 36.

The half mirror 36 is provided between the light source unit 30 and the object to be measured OB. The light beams sequentially emitted from the light source unit 30 are sequentially incident on the half mirror 36. The half mirror 36 sequentially reflects the light beams sequentially incident from the light source unit 30 in the direction of the object to be measured OB.

Further, the reflected light from the object to be measured OB is sequentially incident on the half mirror 36. The half mirror 36 transmits the reflected light incident from the object to be measured OB and applies the transmitted light to the condensing lens 32 side. The condensing lens 32 condenses all of the reflected light which is sequentially transmitted through the half mirror 36. The optical receiver 34 receives all of the light condensed in the condensing lens 32. The object to be measured OB may be irradiated with light beams from the immediately above position (vertical direction) using the half mirror 36. The reflected light obtained when the surface of the object to be measured OB is perpendicular to the lens optical axis of the condensing lens 32 is condensed on the lens optical axis on the back focal plane of the condensing lens 32.

The optical receiver 34 may be placed such that the center position of the light receiving surface of the optical receiver 34 is positioned on the lens optical axis of the condensing lens 32. This also enables the light condensing position of the specularly reflected light from the object to be measured OB to be the center position of the light receiving surface of the optical receiver 34.

Further, as the interval of the beams emitted from the light source unit 30 is narrower, it is possible to reduce the size of the condensing lens 32 and the half mirror 36 and to reduce the focal length of the condensing lens 32.

Although the interval of plural light beams emitted from the light source unit 30 may be adjusted also by adjusting the installation interval of plural light emitting units included in the light source of the light source unit 30, an adjusting optical system which adjusts the interval of the light beams may be provided on the optical path from the light source of the light source unit 30 to the object to be measured OB.

Figure 6:
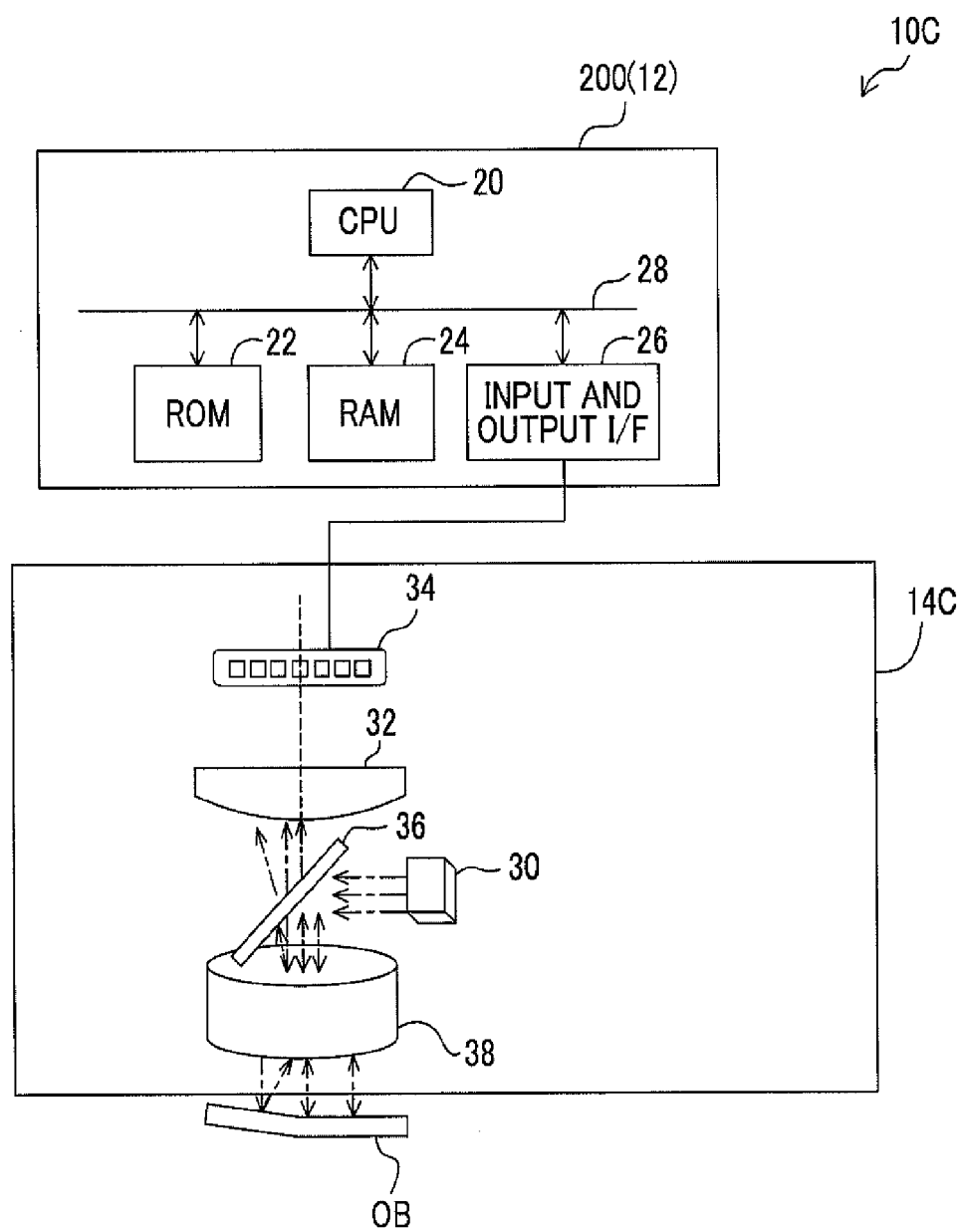
FIG. 6 is a diagram showing still further another configuration example of the measurement device.
Figure 7:
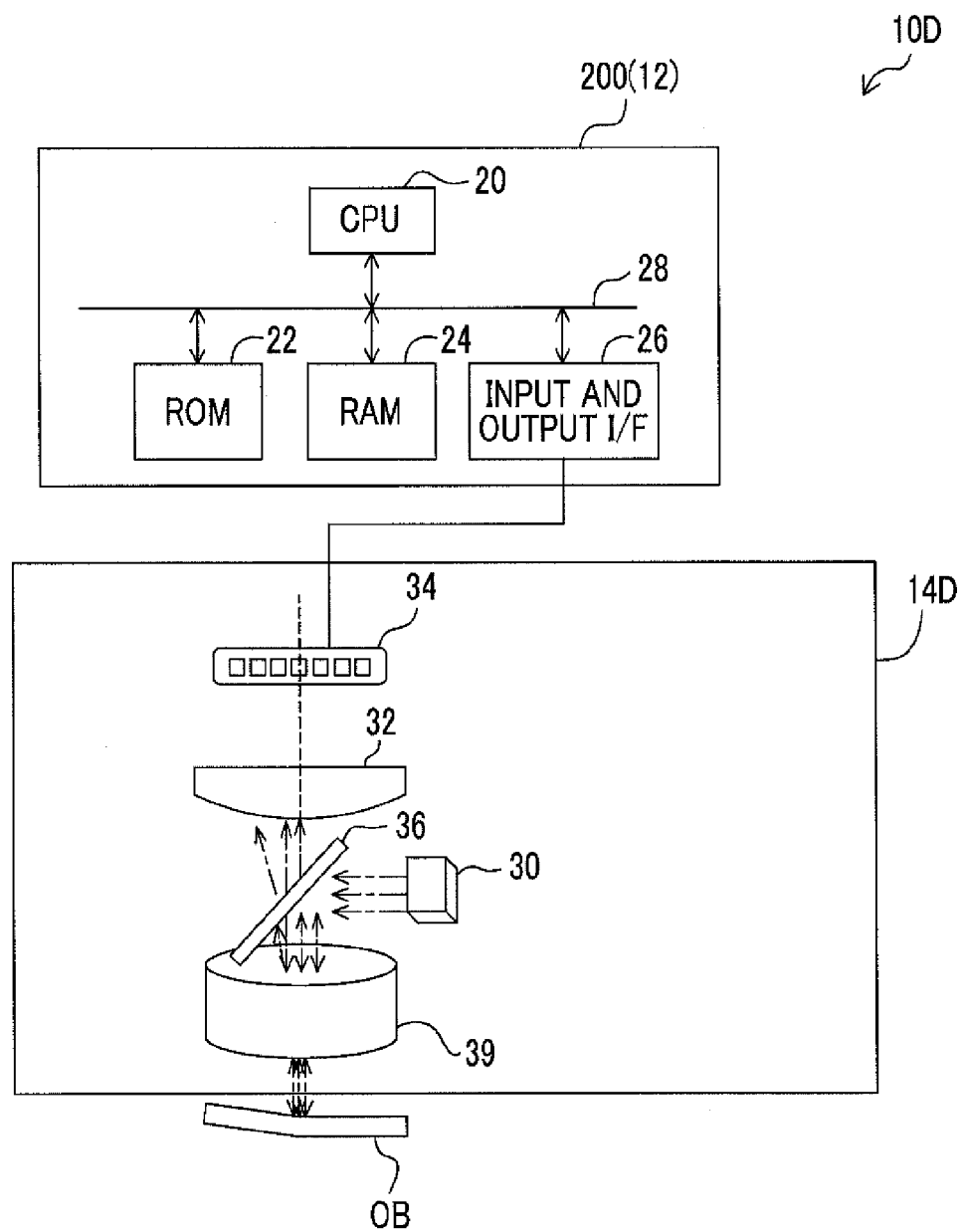
FIG. 7 is a diagram showing still further another configuration example of the measurement device.

A measurement device 10C shown in FIG. 6 has a configuration obtained by adding an adjusting optical system 38 to the configuration of the measurement device 10B shown in FIG. 5. Further, a measurement device 10D shown in FIG. 7 has a configuration obtained by adding an adjusting optical system 39 to the configuration of the measurement device 10B shown in FIG. 5. Since the adjusting optical system of the measurement device 10C and the adjusting optical system of the measurement device 10D are different in the setting (content to be adjusted), they are denoted by different symbols. The adjusting optical system is provided on the irradiation optical path in order to widen or narrow the beam interval. The adjusting optical system 38 shown in FIG. 6 is adjusted to make the interval of light beams incident from the light source unit 30 wider than the interval of light beams emitted from the light source unit 30. The adjusting optical system 38 shown in FIG. 7 is adjusted to make the interval of light beams incident from the light source unit 30 narrower than the interval of light beams emitted from the light source unit 30.

In addition, in the measurement device 10C, the configuration other than the adjusting optical system 38 is the same as that of the measurement device 10B. Also in the measurement device 10D, similarly, the configuration other than the adjusting optical system 39 is the same as that of the measurement device 10B.

As shown in FIG. 6, the adjusting optical system 38 in the measurement device 10C is provided between the light source unit 30 and the object to be measured OB. Plural light beams which are emitted from the light source unit 30 and reflected from the half mirror 36 are incident on the adjusting optical system 38 with the time difference. The adjusting optical system 38 widens the interval of the plural light beams which are incident so as to be emitted in the direction of the object to be measured OB.

In addition, each time when the light beam is emitted from the light source unit 30, the reflected light from the object to be measured OB is sequentially incident on the adjusting optical system 38. The adjusting optical system 38 returns the interval of each of the reflected light which is incident from the object to be measured OB to the original interval (back to the interval before the interval of the light beam emitted from the light source unit 30 is widened) and emits the reflected light to the half mirror 36 side. The half mirror 36 transmits the reflected light incident from the adjusting optical system 38 and emits the transmitted light to the condensing lens 32 side. The condensing lens 32 condenses the reflected light transmitted through the half mirror 36. The optical receiver 34 receives the light condensed in the condensing lens 32.

In FIG. 7, the adjusting optical system 39 in the measurement device 10D is also provided between the light source unit 30 and the object to be measured OB. Plural light beams which are emitted from the light source unit 30 and reflected from the half mirror 36 are incident on the adjusting optical system 39 with the time difference. The adjusting optical system 39 narrows the interval of the plural light beams which are incident so as to be emitted in the direction of the object to be measured OB.

In addition, each time when the light beam is emitted from the light source unit 30, the reflected light from the object to be measured OB is sequentially incident on the adjusting optical system 39. The adjusting optical system 39 returns the interval of each of the reflected light incident from the object to be measured OB to the original interval (back to the interval before the interval of the light beam emitted from the light source unit 30 is narrowed) and emits the reflected light to the half mirror 36 side. The half mirror 36 transmits the reflected light incident from the adjusting optical system 39 and emits the transmitted light to the condensing lens 32 side. The condensing lens 32 condenses the reflected light transmitted through the half mirror 36. The optical receiver 34 receives the light condensed in the condensing lens 32.

In this manner, not only the light beam emitted from the light source unit 30 but also the reflected light reflected by the object to be measured OB is incident on the adjusting optical systems 38 and 39. In other words, the adjusting optical systems 38 and 39 are provided on the optical path from the light source unit 30 to the object to be measured OB and on the optical path from the object to be measured OB to the condensing lens 32.

Figure 8:
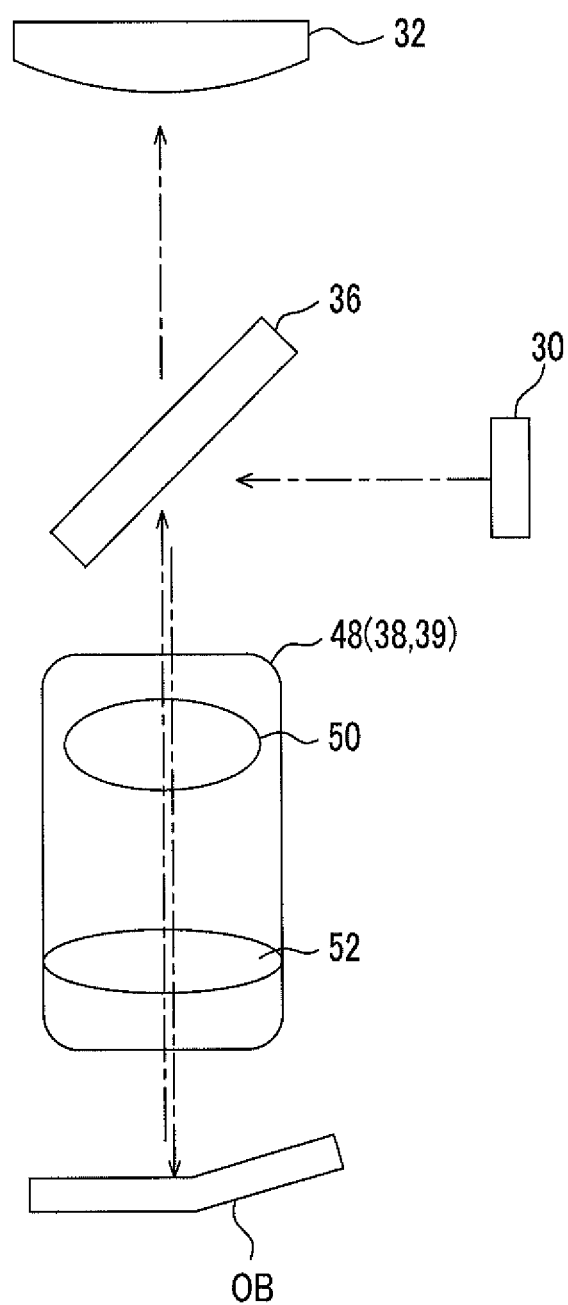
FIG. 8 is a diagram showing an example of a configuration of an adjusting optical system.

FIG. 8 shows an example of the configurations of the adjusting optical systems 38 and 39. In the present exemplary embodiment, a double telecentric lens 48 is used as the adjusting optical systems 38 and 39.

The double telecentric lens 48 includes a pair of lenses 50 and 52. An achromatic lens may be used as two lenses 50 and 52. An aperture stop is not provided between the lenses 50 and 52 of the double telecentric lens 48. Although the incident light may be collimated by the provided aperture stop so as to be parallel light, the reason why the double telecentric lens 48 is provided as the adjusting optical system in the measurement devices 10C and 10D is to adjust the interval of plural light beams. Since it is necessary to measure the light of a wide reflection angle on the optical receiver 34 side by passing also the reflected light with the angular distribution, the aperture stop is not required.

By providing the double telecentric lens 48, the interval of light beams is to be adapted to the required resolution.

Figure 9:
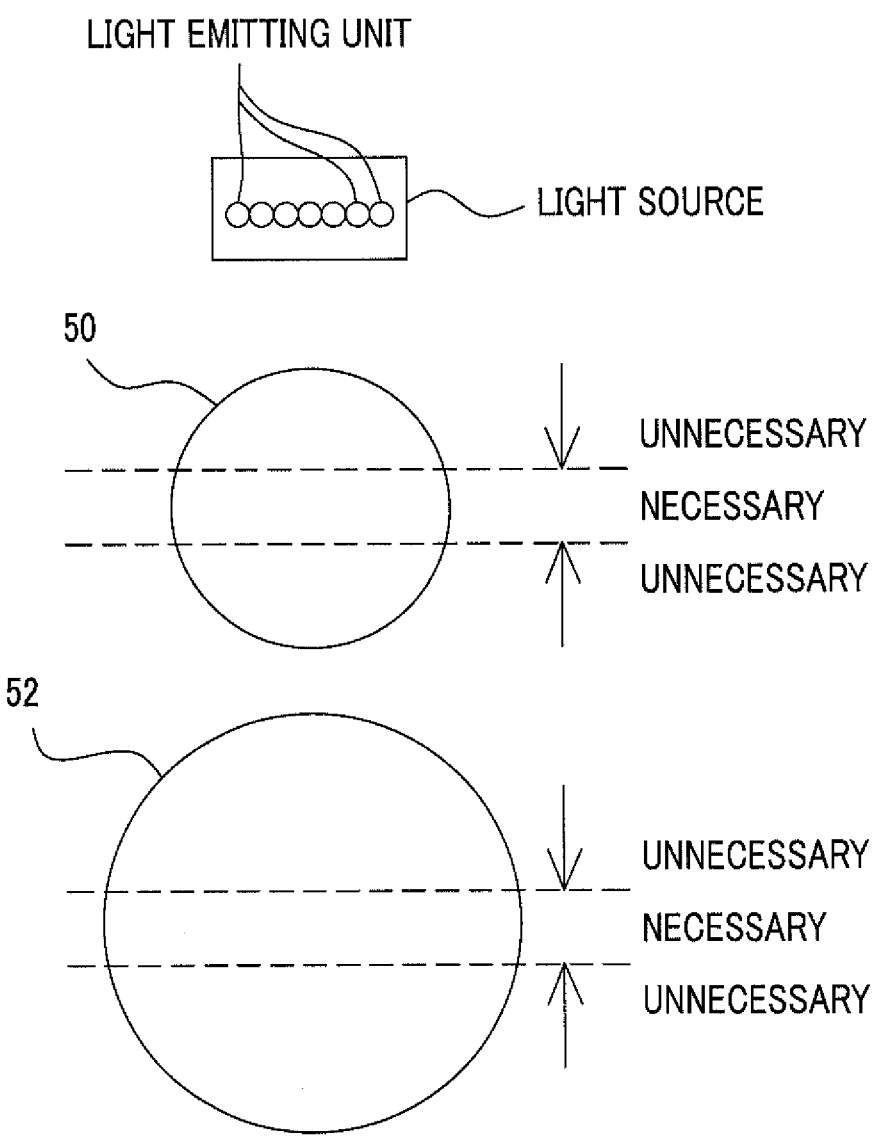
FIG. 9 is a diagram showing an example of an adjusting optical system in which unnecessary parts on an optical path are removed.

However, parts through which the light emitted from each light emitting unit passes (necessary parts in the optical path) and parts through which the light does not pass (unnecessary parts in the optical path) in each of the lenses 50 and 52 are determined according to the arrangement of plural light emitting units of the light source. For example, when the light source of the light source unit 30 is formed by arranging light emitting units such as VCSEL in a row (one dimension), the necessary parts on the optical path of the lenses 50 and 52 and the unnecessary parts on the optical path are determined as shown in FIG. 9. Thus, the double telecentric lens 48 may have a shape obtained by causing at least the necessary parts to remain on the optical path and by removing the unnecessary parts in the optical path. An example of the shape of the double telecentric lens 48 obtained by removing the unnecessary parts on the optical path is shown in FIG. 10.

In addition, it is possible to provide the double telecentric lens 48 as the adjusting optical system on the optical path from the light source unit 30 to the object to be measured OB in each measurement device of the measurement devices 10, 10A, and 10B described above.

Figure 11:
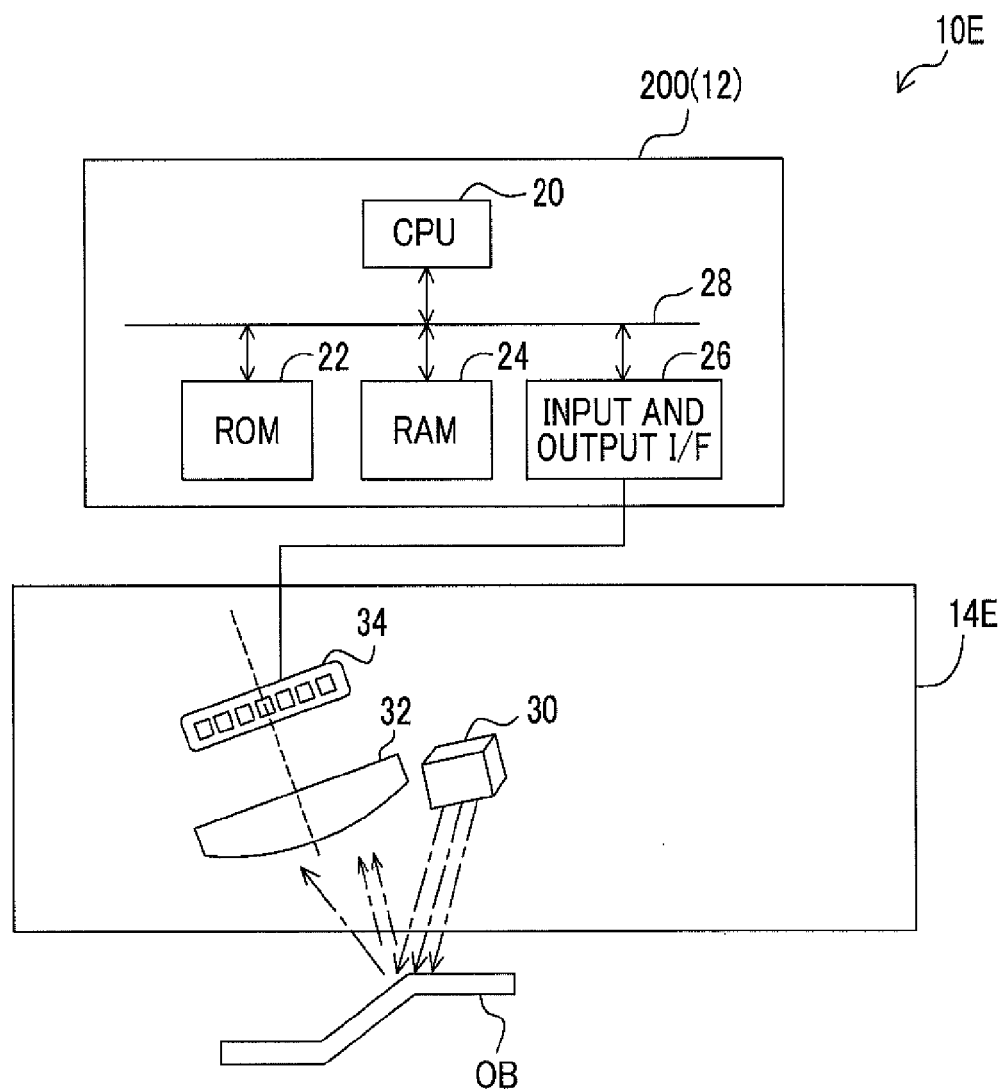
FIG. 11 is a diagram showing still another configuration example of the measurement device.

When the angle of the object to be measured OB is steep, the measurement may be performed by inclining the entire detection unit. In a measurement device 10E shown in FIG. 11, each of the light source unit 30, the condensing lens 32, and the optical receiver 34 configuring a detection unit 14E is provided while being inclined to match the inclination of the object to be measured OB. An adjusting mechanism capable of adjusting the inclination of the detection unit 14E may be provided. For example, there are some cases in which the object to be measured OB with a lot of irregularities may have a part in which a data loss occurs in the measurement by the measurement device 10 shown in FIG. 2. For example, when the angle is steep, there are some cases in which the reflected light is not incident on the condensing lens 32 or is not incident on the light receiving surface of the optical receiver 34. Therefore, first, the measurement is performed without inclining the detection unit 14E, and when there is a part in which a data loss occurs, the measurement is performed again by inclining the detection unit 14E using the adjusting mechanism in order for the data loss not to occur. This enables suppression of the occurrence of data loss.

Figure 12:
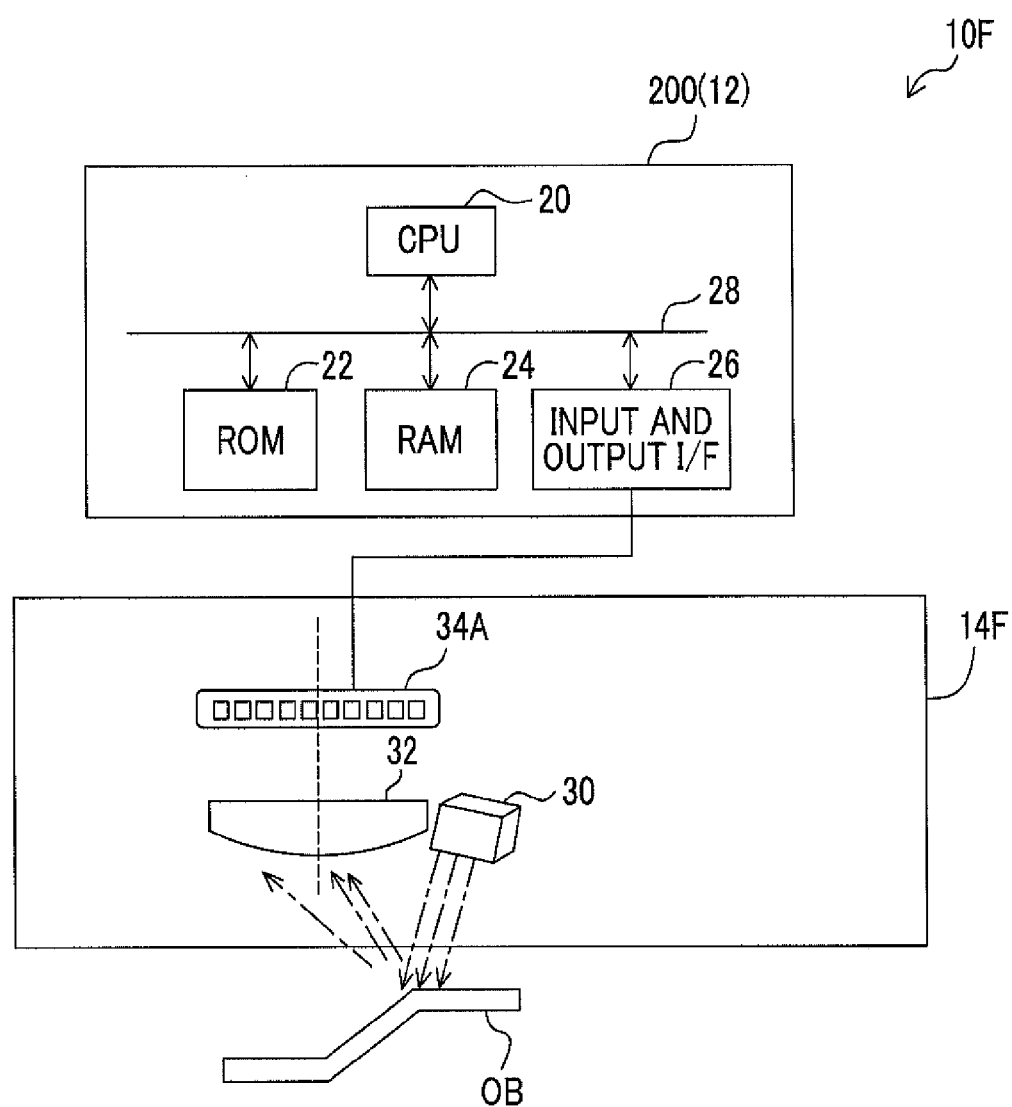
FIG. 12 is a diagram showing further still another configuration example of the measurement device.

Further, assuming that the angle of the object to be measured OB is steep, the optical receiver and the condensing lens may be increased in size. An optical receiver 34A provided in a detection unit 14F of a measurement device 10F shown in FIG. 12 is longer in length of the light receiving surface compared to the optical receiver 34 in each of the measurement devices 10, 10A, 10B, 10C, 10D, and 10E. Furthermore, plural optical receivers 34 may be provided in parallel with each other. Since the optical receiver 34 is not moved, an error is unlikely to occur.

Figure 13:
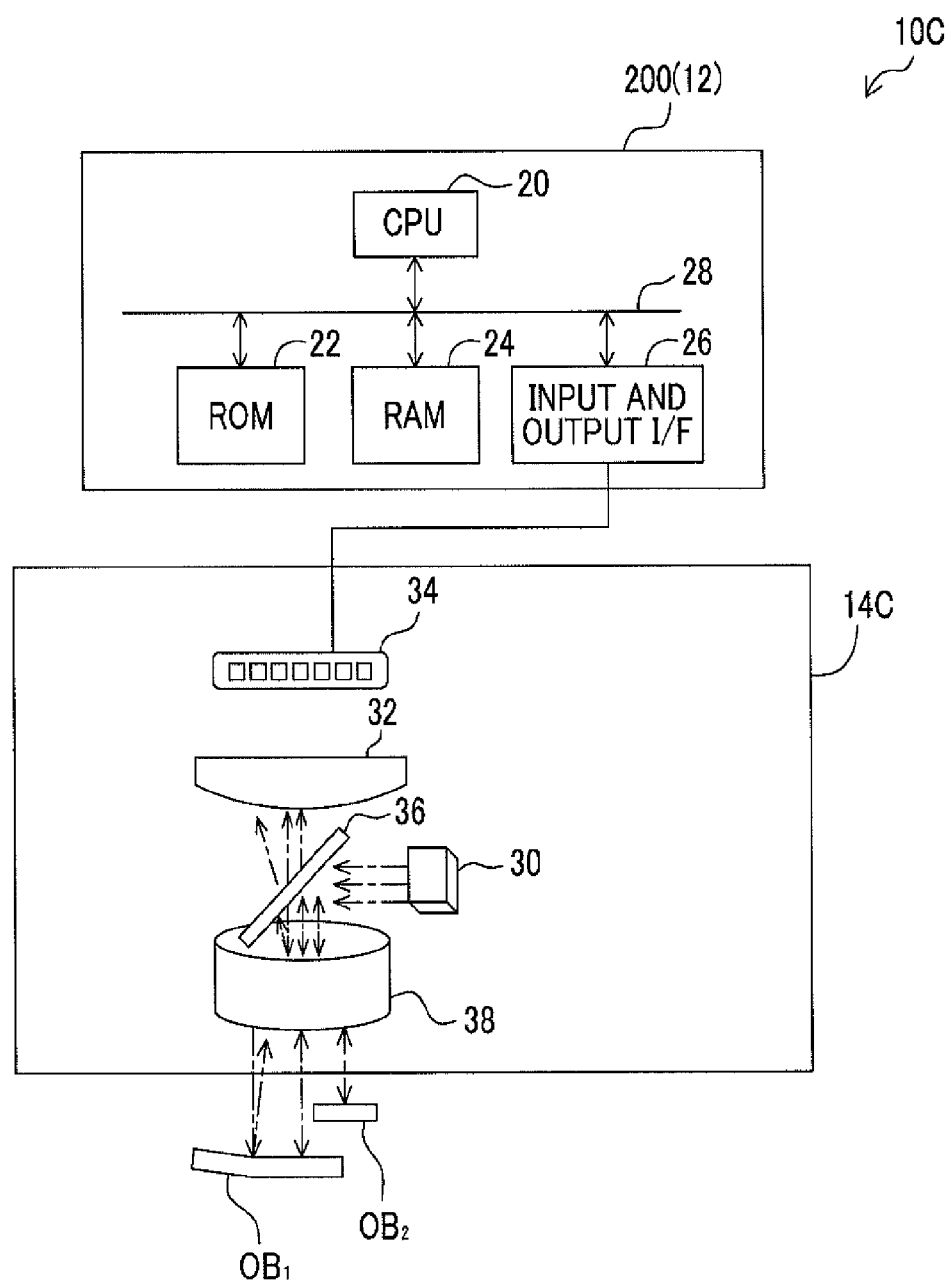
FIG. 13 is a diagram showing a state in which the measurement device measures plural objects to be measured placed in considerably different positions in a height direction.

In addition, it is possible to measure the angles and angular distributions of the surfaces of plural objects to be measured OB, of which positions in the height direction are greatly different also in any one of the measurement devices 10, 10A, 10B, 10C, 10D, 10E, and 10F described above as an example. This is because, as is apparent from expression (1), it is possible to obtain the angle θ of each measurement device described above regardless of the position in the height direction of surface of the object to be measured OB. FIG. 13, as an example, shows a state in which the measurement device 10C measures plural objects to be measured $OB_1$ and $OB_2$, of which positions in the height direction are considerably different.

Figure 14:
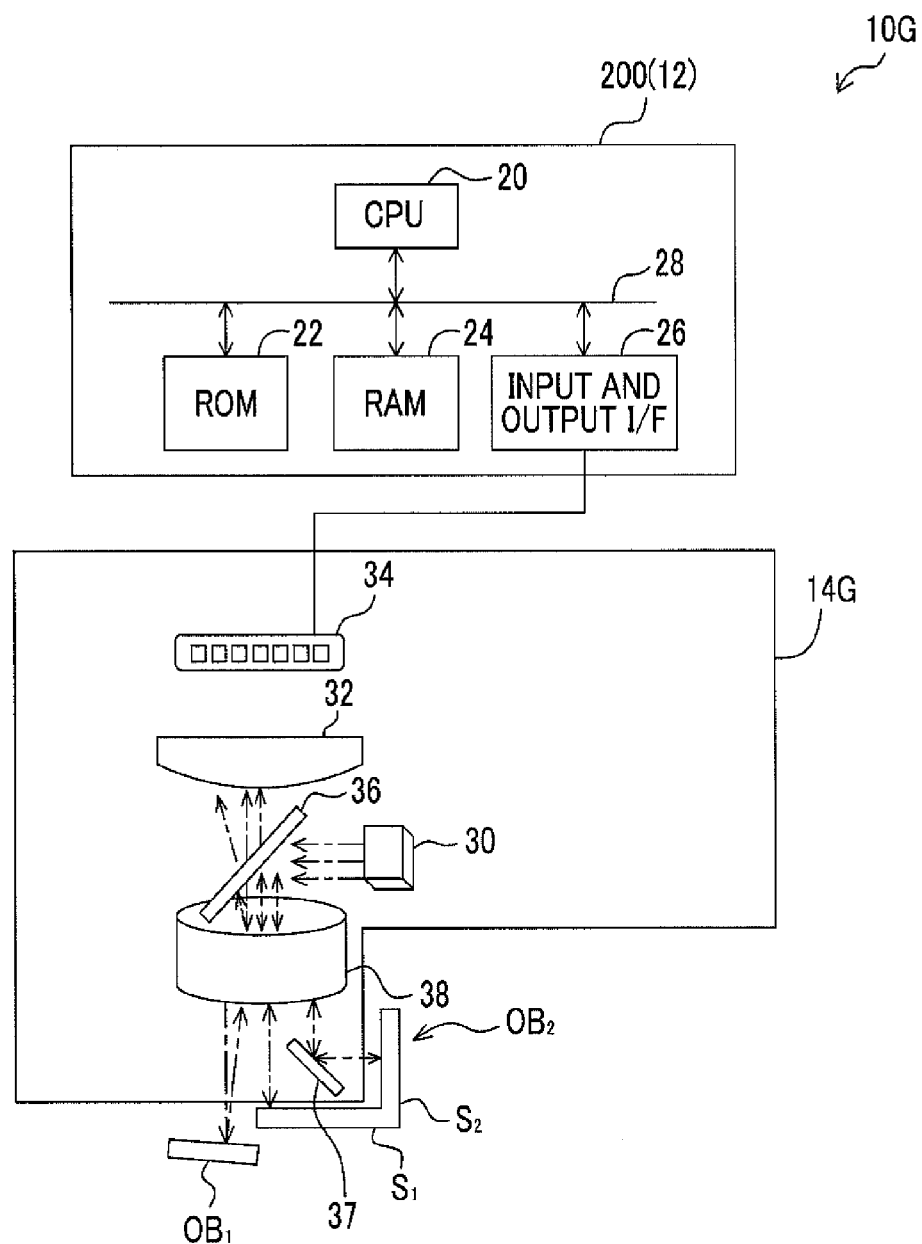
FIG. 14 is a diagram showing further still another configuration example of the measurement device.

Further, it is possible to measure the angle of each surface of the member having plural surfaces. A measurement device 10G shown in FIG. 14 has a configuration obtained by adding a mirror 37 to the configuration of the measurement device 10C. The object to be measured $OB_2$ includes two surfaces $S_1$ and $S_2$ adjacent to each other.

The mirror 37 is provided between the adjusting optical system 38 and the object to be measured $OB_2$. The mirror 37 receives at least one of plural light beams emitted from the light source unit 30 and reflects the received light beam to the surface S2 of the object to be measured $OB_2$. Since the light beam of which the optical path is not bent by the mirror 37 travels downwardly as it is, the surface $S_1$ of the object to be measured $OB_2$ and the object to be measured $OB_1$ are irradiated with the light beam.

Thus, for example, when the design value of the angle between one surface and the surface adjacent thereto is predetermined in a certain member, it is possible to confirm whether the angle of the member that is manufactured actually meets its design value. For example, when the design value of the angle between one surface and the surface adjacent thereto in a certain member is a right angle (90°), it is possible to check a slight angular error such as whether the angle of the member that is manufactured actually is 89° or 91°.

Figure 15:
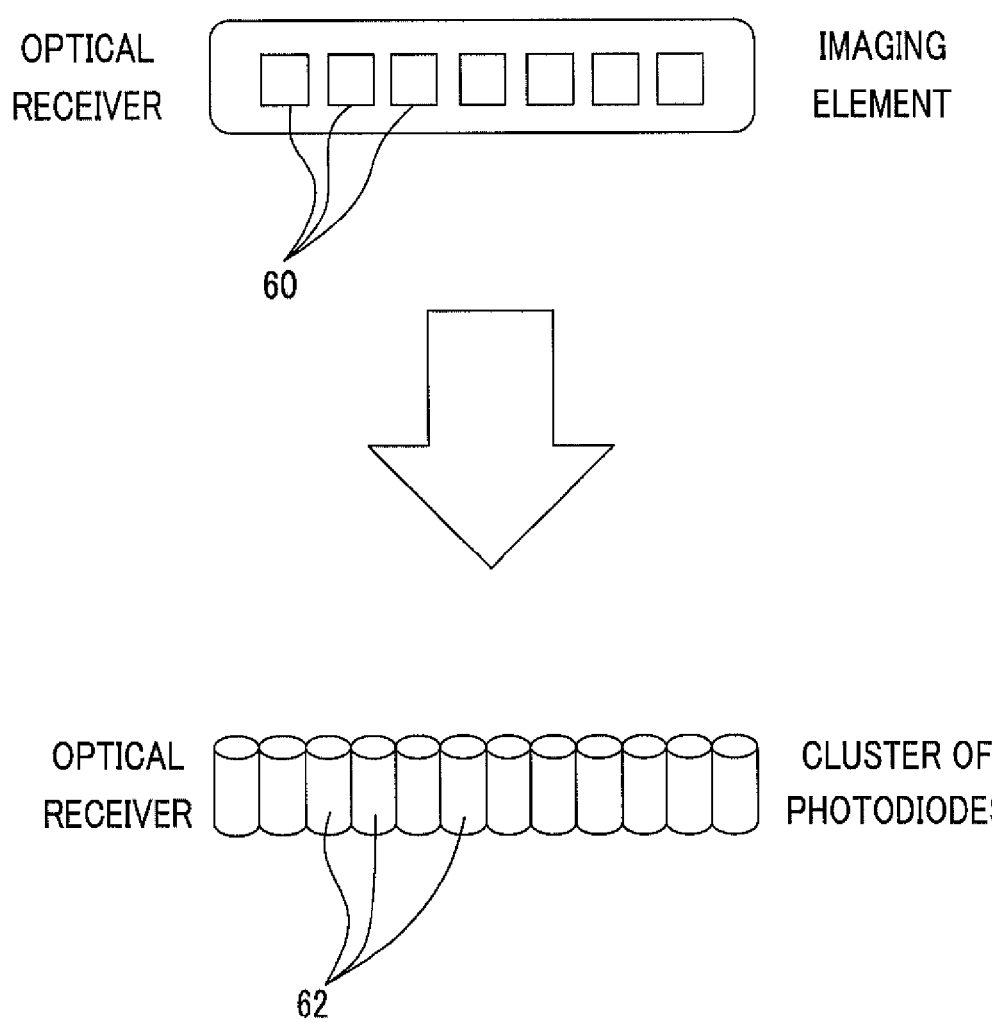
FIG. 15 is a diagram showing a configuration example of an optical receiver.

Further, as shown in FIG. 15, although the optical receiver provided in each of the measurement devices may be configured of the imaging element having plural arranged pixels 60, it may be configured by arranging plural photodiodes 62. In general, when the optical receiver is the imaging element having the plural arranged pixels 60, reading is possible at a resolution higher than when the optical receiver is a cluster of the photodiodes 62, but the read rate is slower than that of the photodiode 62. When an imaging element of high performance capable of performing processing at high speed is used, it costs a lot. Therefore, for example, when the object to be measured OB is not stationary but is in motion, the fast reading speed is required, so that the optical receiver may be the cluster of the photodiodes 62. However, when the cluster of the photodiodes 62 is used as the optical receiver, the reading resolution is slightly rough as compared with that of the imaging element. Therefore, whether the optical receiver is formed by using the cluster of the photodiodes 62 or by using the imaging element may be determined according to the measurement purpose.

Further, a collimating optical system which collimates each of plural light beams emitted sequentially from the light source may be provided on the optical path from the light source to the object to be measured.

Figure 16:
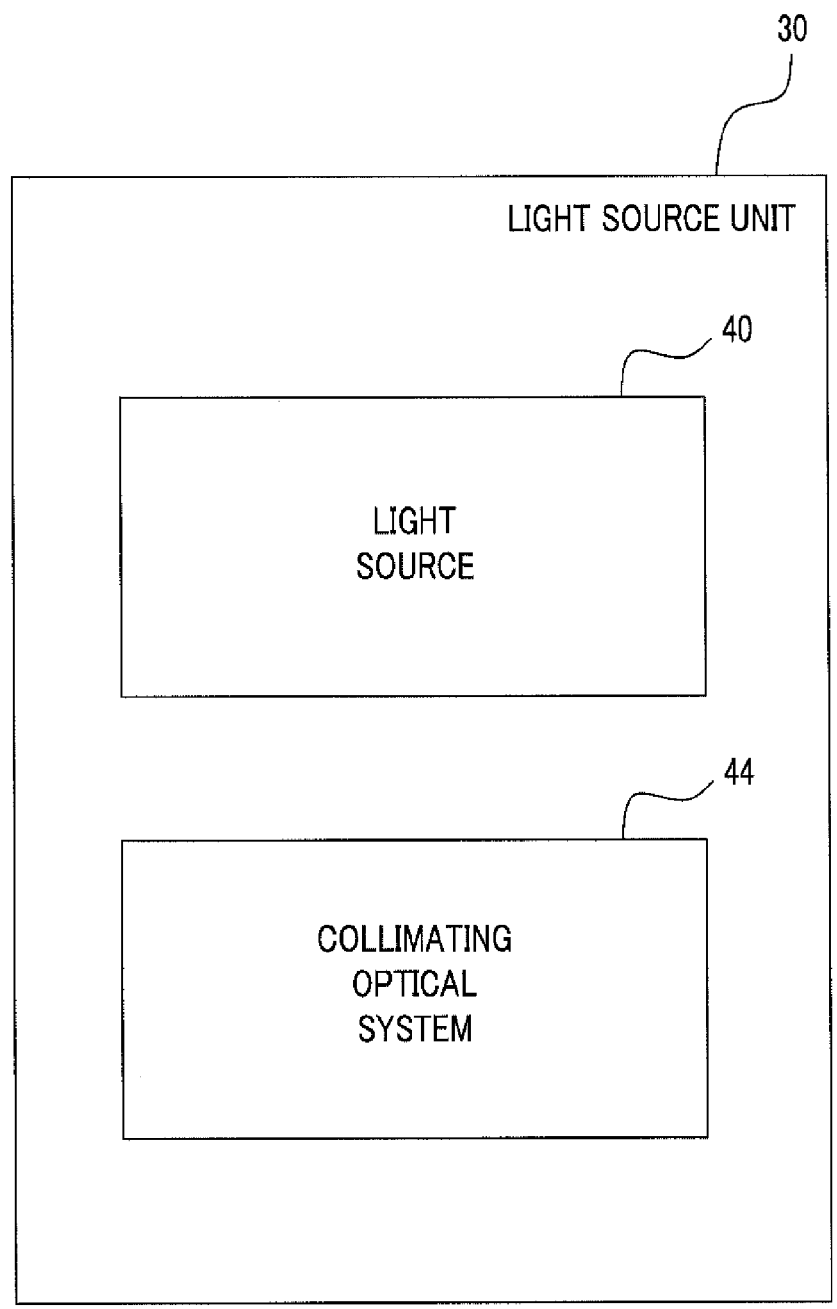
FIG. 16 is a diagram showing a configuration example of a light source unit when a collimating optical system is provided in the light source unit.
Figure 17:
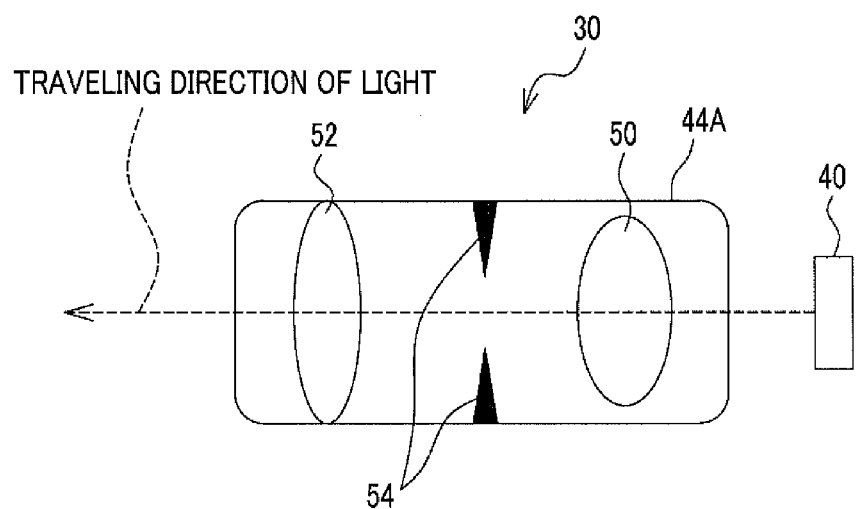
FIG. 17 is a diagram showing a configuration example when a double telecentric lens is used as a collimating lens.

For example, as shown in FIG. 16, the light source unit 30 of each of the measurement devices 10, 10A, 10B, 10C, 10D, 10E, 10F, and 10G described above as an example may be configured to include a light source 40 and a collimating optical system 44. The collimating optical system 44, as shown in FIG. 17, is provided on the light emitting side of the light source 40. The collimating optical system 44 suppresses the diffusion of light emitted from the light source 40. For example, as shown in FIG. 17, a double telecentric lens 44A may be used in the collimating optical system 44.

The double telecentric lens 44A includes, as shown in FIG. 17, the pair of lenses 50 and 52, and an aperture stop 54 which is placed between the pair of lenses 50 and 52. It is possible to use achromatic lenses as the two lenses 50 and 52. The aperture stop 54 is provided according to the focal plane of each of the lenses 50 and 52. In addition, when the size of the aperture stop 54 is reduced, only a parallel light component is captured and thus the intensity of light is decreased. Therefore, the size of the aperture stop 54 is set according to the required precision and the required intensity of light.

Figure 18:
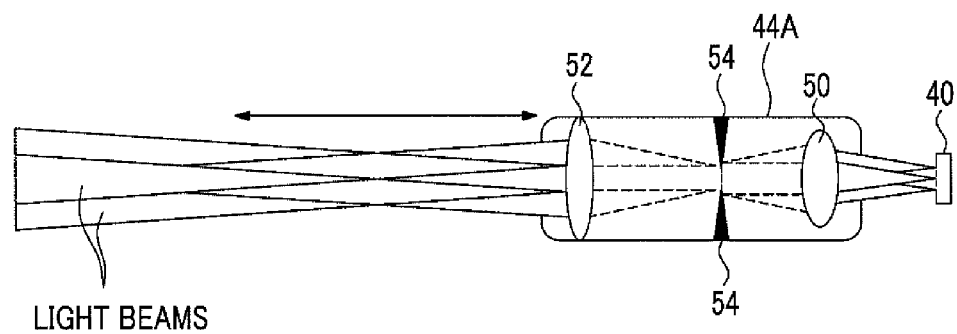
FIG. 18 is a diagram schematically showing a state in which plural light beams are emitted from the light source through the double telecentric lens.

In addition, when the double telecentric lens 44A is provided, the following advantage is obtained. This advantage will be described with reference to FIG. 18. FIG. 18 is a diagram schematically showing a state in which the object to be measured OB is irradiated with plural light beams through the double telecentric lens 44A from the light source 40.

As described above, the double telecentric lens 44A includes the pair of lenses 50 and 52, and the aperture stop 54 which is placed between the pair of lenses 50 and 52. Achromatic lenses are used as the two lenses 50 and 52. The aperture stop 54 is provided according to the focal plane of each of the lenses 50 and 52.

In addition, although plural light beams are sequentially emitted from the light source 40 it is preferable that the object to be measured OB be provided in the range in which the irradiation areas between the light beams from the light emitting unit adjacent to the light source 40 do not overlap. This is because, even when the light beams are sequentially emitted with the time difference from the light emitting unit one by one, when the irradiation areas by the adjacent light beams increasingly overlap on the object to be measured OB, the output values are not independent of each other. In FIG. 18, for example, in the range denoted by an arrow, the irradiation areas by the adjacent light beams do not overlap. Thus, the object to be measured OB may be placed such that the part to be measured of the object to be measured OB is positioned within this range.

In addition, the light source 40 may be provided on the focal plane of the lens 50 close to the light source 40 of the double telecentric lens 44A. Thus, the light beams passing through the aperture stop 54 become parallel light, thereby reducing the error in the irradiation angle with respect to the positional deviation of the aperture stop 54.

In addition, some of plural beams of light emitted from the light emitting unit of the light source 40 (for example, the light emitted from the light emitting unit at both ends of plural light emitting units that are arranged along a predetermined direction or from the light emitting unit in the predetermined range containing the light emitting unit at both ends) may be visible light. Thus, the measurement range is visual.

Further, what is received by the optical receiver included in the measurement device is not limited to only the reflected light from the object to be measured OB. For example, the optical receiver may receive the transmitted light transmitted through the object to be measured OB. In this case, the condensing lens 32 and the optical receiver 34 are placed on the side through which light applied to the object to be measured OB is transmitted, that is, the side opposite to the side in which the light source 40 is placed.

Hitherto, although various measurement devices have been described as an example, the measurement device is not limited to the exemplary embodiment described above, and various modifications, changes and improvements are possible. For example, the exemplary embodiments shown above and the modified example may be combined and configured.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A measurement device comprising:
   a light source that sequentially emits a plurality of beams of light which are respectively incident on an object and of which optical axes are parallel or substantially parallel to each other;
   a condensing optical system that condenses the plurality of beams of light reflected from the object or the plurality of beams of light transmitted through the object;
   a light receiving unit, a light receiving surface of which is placed on a back focal plane of the condensing optical system, and that outputs a distribution or a center position of an intensity of light received in the light receiving surface; and
   a measurement unit that measures at least one of an angle and an angle distribution of a surface of the object, based on an output value output from the light receiving unit for each light applied to the object from the light source.

2. The measurement device according to claim 1,
   wherein the light receiving unit is placed such that a light condensing position of specularly reflected light or specularly transmitted light from the object is a center position of the light receiving unit.

3. The measurement device according to claim 2, further comprising:
   an adjusting optical system that adjusts intervals among optical axes of the plurality of beams of light sequentially emitted from the light source so as to be emitted toward the object.

4. The measurement device according to claim 3,
   wherein the adjusting optical system adjusts the intervals among the optical axes of the plurality of beams of light emitted from the object so as to be emitted toward the light condensing position.

5. The measurement device according to claim 4, further comprising:
   a collimating optical system that is provided on an optical path from the light source to the object and that collimates each of the plurality of beams of light sequentially emitted from the light source.

6. The measurement device according to claim 4,
   wherein the light source is a vertical cavity surface emitting laser.

7. The measurement device according to claim 3, further comprising:
   a collimating optical system that is provided on an optical path from the light source to the object and that collimates each of the plurality of beams of light sequentially emitted from the light source.

8. The measurement device according to claim 3,
   wherein the light source is a vertical cavity surface emitting laser.

9. The measurement device according to claim 2, further comprising:
   a collimating optical system that is provided on an optical path from the light source to the object and that collimates each of the plurality of beams of light sequentially emitted from the light source.

10. The measurement device according to claim 2,
    wherein the light source is a vertical cavity surface emitting laser.

11. The measurement device according to claim 1, further comprising:
    an adjusting optical system that adjusts intervals among the optical axes of the plurality of beams of light sequentially emitted from the light source so as to be emitted toward the object.

12. The measurement device according to claim 11,
    wherein the adjusting optical system adjusts the intervals among the optical axes of the plurality of beams of light emitted from the object so as to be emitted toward the light condensing position.

13. The measurement device according to claim 12, further comprising:
    a collimating optical system that is provided on an optical path from the light source to the object and that collimates each of the plurality of beams of light sequentially emitted from the light source.

14. The measurement device according to claim 12,
    wherein the light source is a vertical cavity surface emitting laser.

15. The measurement device according to claim 11, further comprising:
    a collimating optical system that is provided on an optical path from the light source to the object and that collimates each of the plurality of beams of light sequentially emitted from the light source.

16. The measurement device according to claim 11,
    wherein the light source is a vertical cavity surface emitting laser.

17. The measurement device according to claim 1, further comprising:
    a collimating optical system that is provided on an optical path from the light source to the object and that collimates each of the plurality of beams of light sequentially emitted from the light source.

18. The measurement device according to claim 1,
    wherein the light source is a vertical cavity surface emitting laser.

19. The measurement device according to claim 1,
    wherein the light receiving unit is either a Position Sensitive Detector (PSD) or an imaging element.

20. The measurement device according to claim 1,
    wherein the light receiving unit is a cluster of a plurality of photodiodes.

* * * * *